June 24, 1952 — W. F. WELLS ET AL — 2,601,576
POWER SAW CONTROL
Filed July 6, 1949 — 3 Sheets-Sheet 1

INVENTORS
WILLIAM F. WELLS &
DANA H. WELLS
BY
ATTORNEYS

INVENTORS
WILLIAM F. WELLS &
DANA H. WELLS

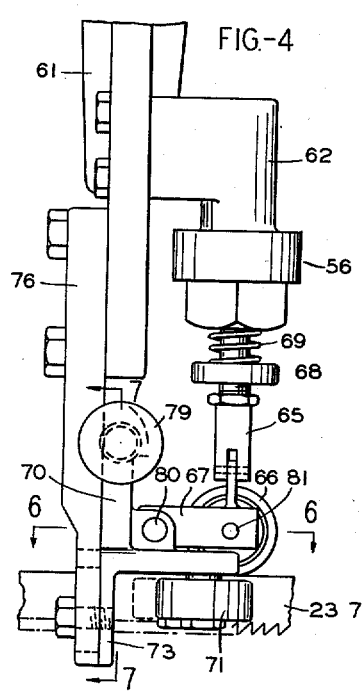

Patented June 24, 1952

2,601,576

UNITED STATES PATENT OFFICE 2,601,576

POWER SAW CONTROL

William F. Wells and Dana H. Wells,
Three Rivers, Mich.

Application July 6, 1949, Serial No. 103,206

2 Claims. (Cl. 29—68)

The invention relates to novel and improved power saw control structure.

An object of the invention is to provide means for automatically controlling the application of cutting pressure to the saw blade.

A further object of the invention is to provide novel and improved means for guiding and controlling the advance of the saw blade at spaced locations whereby to avoid cocking of the blade with reference to the desired direction of saw cutting movement.

A further object of the invention is to provide novel and improved control means for a power saw, whereby to avoid excessive friction and consequent necessity for a coolant.

A further object of the invention is to provide means for adjusting the angle of the saw blade with respect to the plane of approach of the blade to the work.

A further object of the invention is to provide novel control means for the movable jaw of the work holding vise.

Other objects and advantages will be apparent from a study of the following description of one embodiment of the invention, in conjunction with the accompanying drawings, in which, Fig. 1 is a front elevational view of a power saw, and guiding and control means therefor, constructed in accordance with the teachings of our invention.

Fig. 4 is a front elevational view, somewhat enlarged, showing a portion of the structure shown in Fig. 1;

Fig. 5 is an end elevational view of Fig. 4, from the right thereof;

Figs. 6 and 7 are sectional views taken on the respective lines 6—6 and 7—7 of Fig. 4;

Fig. 8 is an elevational view from the left of Fig. 6;

Fig. 9 is a longitudinal sectional view of the actuating means for the movable vise jaw;

Fig. 10 is a view looking towards Fig. 9 from the right; and

Figure 1:
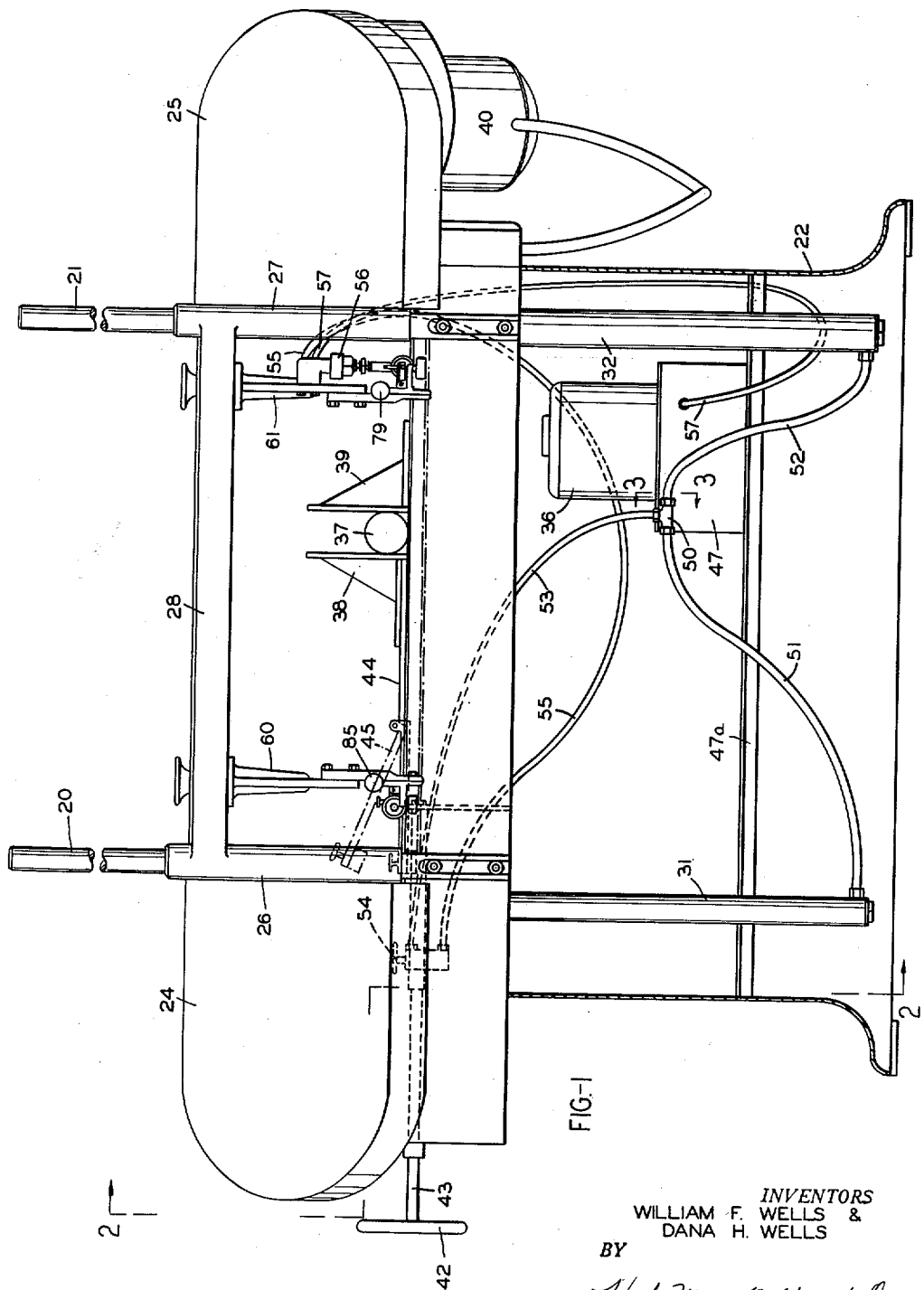

Fig. 11 is an enlarged view of part of the structure shown in Fig. 1.

The embodiment herein illustrated is a saw of the endless, continuously running type, generally known as a band saw. When used in automatic operation on a work piece clamped in fixed position, such as in cutting bar stock, ingots, billets, or other articles of substantial cross sectional area, great difficulty has heretofore been encountered in maintaining a suitable working pressure on the blade, since the pressure must be varied depending on a number of factors, such as the character of the work piece, the metal, alloy, or other material from which it is formed, the ease with which it can be cut, the number of saw teeth simultaneously in contact with the work piece, etc., etc. If for any reason involving the above or other factors the pressure is too great, or the saw blade is unevenly or improperly aligned in the cut, the saw teeth may be torn, or there may be an actual tearing of the saw blade (as we will term the toothed strip constituting the band saw).

As soon as some teeth are torn off, complete deterioration of the cutting edge of the saw rapidly results, and band saw strips are not only expensive, but production time is lost in changing blades, the work piece may be undesirably marred, and there is some personnel danger when a rapidly rotating band saw jams or breaks.

By means of the invention now to be described the saw blade is biased by gravity against the work piece, but the cutting resistance encountered by the saw produces, by the mechanism to be described, a braking or restraining effect on the rate of descent, the effect being in direct proportion to the resistance, so that the rate of saw descent is decelerated as the resistance increases, and vice versa. As a result, the cutting pressure is constant, regardless of the character of the material being cut, and regardless of the dimensions of the work piece, and a small work piece, or one formed from a free-cutting alloy, can be cut rapidly, while a thick or tough work piece will be cut more slowly but without undue wear and tear on the saw. Almost any metal, in a variety of shapes and forms, can be cut accurately without excessive friction, and without the use of a coolant.

Speaking first in general terms, descent of the saw blade and its accompanying housing and actuating elements is hydraulically controlled, saw descent being permitted by displacement of a quantity of liquid in a closed system past a control valve, in dash pot fashion, but the amount of valve opening being under automatic control, and being regulated by resistance to saw advance. A further safety factor is introduced into the system consisting of a second valve which is responsive to manual control, whereby to impose an upper limit to the range wherein the saw advance may be automatically controlled.

The operation of the saw will now be more specifically described, with general reference at first to Figs. 1 and 2, and more particularized description later with reference to other pertinent drawings.

The saw assembly is housed on a movable carriage adapted to travel upwardly or downwardly on a pair of spaced piers 20 and 21 which are fixed with respect to a hollow base 22. The saw 23 is mounted on spaced pulleys, not shown, but respectively contained within the spaced sheet metal guards 24 and 25. The carriage has a rigid frame comprising the tubular bearings 26 and 27 and the cross brace 28. The bearings 26 and 27 have an accurately bored sliding fit on respective piers 20 and 21. The saw assembly is of course co-planar with the guards 24 and 25, and is tilted to an angle of approximately 45 degrees rearwardly and away from the plane of the piers.

Figure 2:
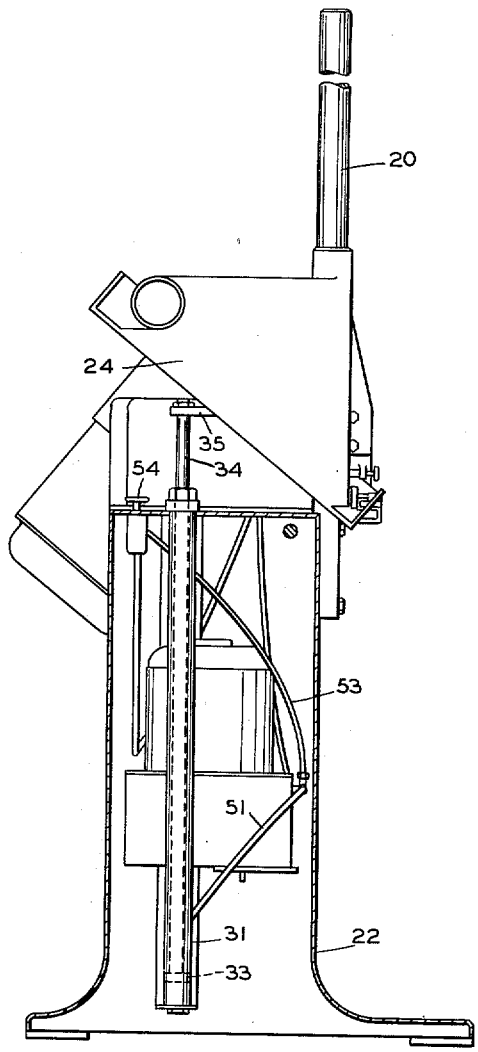
Fig. 2 is a view, partly in section, partly in end elevation, taken approximately on the line 2—2 of Fig. 1.

A pair of hydraulic power cylinders 31 and 32 contain pistons 33, one being indicated in Fig. 2. The pistons are provided with piston rods 34, the other ends of the rods being fixedly connected to abutments 35 on guards 24 and 25. A motor-pump assembly 36 supplies hydraulic pressure to the lower ends of cylinders 31 and 32 when it is desired to raise the carriage. The oil circulation system and its control will be more fully described hereinbelow.

Upward and downward movement of the carriage produces corresponding movement of the saw. Assuming the saw to be in its uppermost position, a work piece 37 is placed between the jaws 38 and 39 of the vise. The jaw 39 is anchored on the frame, but of course may be moved if necessary. The jaw 38 is the normally movable jaw, and is controlled as follows. A control wheel 42 is fixed to a shaft 43, a portion of said shaft 43a being threaded. The shaft is journaled in the frame, and is rotatable freely, but not movable endwise. The movable jaw 38 has an extended base plate 44 normally slidable in a track (not shown) in the frame, but having a pivoted finger 45 provided with a semi-cylindrical segment 46 which has threads complementary to those on the shaft 43. When a new work piece is to be inserted in the vise, the finger 45 is lifted so as to disengage segment 46 from shaft portion 43a as shown in broken line in Fig. 1. Vise jaw 38 may then be moved freely to the left, the work piece is inserted, and the vise jaw is moved to the right to initial contact with the work piece. The finger 45 is then dropped to permit engagement of segment 46 with shaft portion 43a (Fig. 9). Rotation of wheel 42 now forcibly tightens the grip of the vise.

Figure 3:
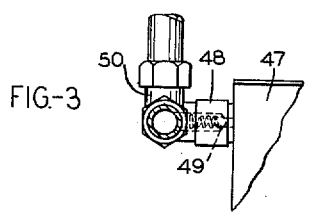
Fig. 3 is a sectional view taken on the line 3—3 of Fig. 1.

The oil pressure system will now be described. The oil supply is contained in a reservoir 47 on a shelf 47a within the base 22. Upon or adjacent the reservoir is the combined motor and pump 36 heretofore mentioned. The oil leaves the reservoir through a nipple 48 containing a check valve 49 (Fig. 3) and then through the T connection 50 to three pipes 51, 52 and 53. Pipes 51 and 52 go to the respective pressure heads of cylinders 31 and 32. Pipe 53 goes to a manual control valve 54 near the operator's position. From the manual control valve a pipe 55 leads to an automatically controlled needle valve 56 to be described later, and best shown in Fig. 5. This is the means heretofore mentioned as being dependent on the resistance to saw advance. From the needle valve a pipe 57 returns to reservoir 47.

Operation of the system is as follows. Assume that the saw carriage is at the bottom of its travel, the manual valve 54 is closed, blocking return to the reservoir through pipes 55 and 57. Motor 36 is energized, thereby supplying pressure fluid through nipple 48 and pipes 51 and 52 to the pressure head of cylinders 31 and 32. This forces pistons 33 and rods 34 upwardly, and raises the carriage. An automatic safety stop of familiar type can be used to limit the path of upward travel, such as a throw-off switch engaged by the carriage to cut off motor 36. When the work piece is in place, the motor 36 is cut off, and manual valve 54 is opened. The weight of the carriage exerts a back pressure on the pressure fluid, by means of pistons 33, and the oil is forced out of cylinders 31 and 32, and through pipes 51 and 52. The check valve 49 prevents a short-cut return to the reservoir, and the fluid is forced through pipe 53 and presently open valve 54 from whence it goes through pipe 55, automatically controlled valve 56 and pipe 57 to reservoir 47.

It will be apparent that the speed of descent of the saw carriage will depend on the dash pot effect of valves 54 and 56, and that the effect will be ultimately dependent on the valve which is open the least amount. Assuming that manual valve 54 is open to a certain working position, then variation in the opening of valve 56 will be the determining factor in the speed of descent of the carriage, and if, as in this case, the resistance to saw advance is made effective on valve 56, then said resistance controls the descent of the carriage.

In describing the operation of the valve herein generally identified by reference character 56, reference should be had particularly to Figs. 4 and 5.

Brackets 60 and 61 are suspended from the cross brace 28 of the carriage (Fig. 1). Fixedly attached to bracket 61 is a valve body 62 having a hollow chamber 63 therein which is in communication with pipes 55 and 57. Within the body 62, and between the ports for pipes 55 and 57, is a restricted neck 64 providing an annular shoulder serving as a seat for an upwardly seating valve plunger 65. Operatively attached to the lower end of the plunger is an idler wheel 66 having frictional engagement with the top edge of saw blade 23. The span of saw blade between its supporting pulleys has a certain amount of upward yield depending on the amount of resistance to cutting, and the plunger is responsive to saw blade flexure so as to vary the clearance between the plunger 65 and its seat, and consequently the size of the opening through which oil can be displaced, as heretofore described.

The wheel mounting is additionally stabilized by means of a link 67 which is operatively attached to wheel 66, and to a swingable yoke 70, later to be described.

The plunger is normally biased to open position by means of a helical spring 69 disposed between the valve body 62 and an abutment 68 fixed on the plunger. It will be apparent that cutting resistance must first overcome the biasing resistance of spring 69 before it can produce any valve-closing effect on the plunger, and consequently the flexure rating of the spring determines the normal minimum pressure downwardly effective upon the saw blade. Increase of pressure beyond this minimum produces upward movement of plunger 65, slows down oil escape through the plunger valve, and decreases the rate of descent of the carriage. If the resistance encountered is so great that the plunger valve is completely closed, the carriage comes to a complete stop, although the saw continues to run.

The saw blade must maintain contact with the work piece, because otherwise the valve would be opened by spring 69. Since the saw is still running, but at a greatly decelerated rate of descent, the work piece is being cut without excessive wear and tear on the saw teeth. As soon as the resistance decreases, the saw cuts faster, the plunger valve opens further, and the carriage descends faster.

A control of the nature just described works evenly since the various forces tend to maintain an equilibrium at a constant cutting pressure, and these forces are continually applying the needed correction. The strength of spring 69 can be so selected that the resistance never reaches the point where the saw is broken or the saw teeth torn. The life of the saw blade is therefore materially increased, and, obviously, cutting costs are greatly reduced.

The saw carriage is tilted, with similar effect on the saw-carrying pulleys so that the cutting span of the blade tends to tilt from the vertical in the neighborhood of the work piece. It is therefore necessary to provide means for applying a limited amount of adjustment in the angular relationship between the plane of the saw blade and the plane of the top surface of the work. The opposed sides of the blade 23 are gripped between a pair of rollers 71 and 72 carried on respectively opposed legs 73 and 74 of a yoke 70 heretofore mentioned. The yoke has a cylindrical projection 75 nested with a rotating fit in a lower end extension 76 of bracket 61. The segmental top of the yoke has a screw thread 77 which engages a similar thread 78 on a screw carried on the part 76. It will be apparent that rotation of the screw control knob 79 rotates the yoke 70 and consequently changes the inclination of the blade gripped between rolls 71 and 72. By means of the link 67 heretofore mentioned, there is a tie-up between yoke 70 and roll 66, the link being pivotally attached to the yoke at 80 and to the roll 66 at 81.

We have described the automatic control by means of the plunger valve and accompanying structure carried on the lower end of bracket 61 (Fig. 1) and shown in detail in Figs. 4 to 8 inclusive. This control is fully sufficient to accomplish the purposes alleged in the foregoing description. We have however devised additional compensating means carried on the lower end of bracket 60. Its purpose is to provide a compensating pressure near the opposite end of the working stretch of the saw. This compensating means will now be described with specific reference to Fig. 11.

Bracket 60 has a lower end extension 83 upon which a yoke 84 is adjustably pivoted by means of complementary screw thread members controlled by knob 85, the structure being similar to that above described. There are likewise a pair of rolls 86 and 87 for gripping the saw blade, and a pressure roll 88 resting on the upper edge of the blade. In the present instance the pressure on roll 88 is supplied by a helical spring 89 carried on a stud 90 which is threadedly fixed in an arm 91 of yoke 84. The roll 88 is rotatably carried on a swingable arm 92 pivoted to yoke 84 at 93. Since the spring is backed up against the head of stud 90, and presses downwardly against arm 92, it urges roll 88 against the blade with a pressure depending on the strength of the spring.

In selecting spring 89, it is matched to have approximately the same resistance to compression as spring 69 heretofore described, so as to have an evenly balanced cutting span, and to further achieve the even operation secured by the spaced carriage guides 20 and 21.

The valve 56 may also be referred to herein as a needle valve or metering valve, but for simplicity the structure thereby designated will be characterized in the appended claims as a plunger valve. It is of special design, using a diaphragm 93 (Fig. 5) instead of a conventional packing gland, to thereby make it positively leak proof and also to eliminate the sealing friction of a packing gland. A packing gland might well introduce so much friction as to materially oppose the bias of spring 69, and reduce the efficiency of the valve.

What we claim is:

1. Power saw apparatus comprising a fixed, work-supporting bed, a saw blade of endless type, carriage means for supporting said saw blade, means for producing continuous movement of said saw blade, a fluid power cylinder fixed with respect to said bed, a piston reciprocable in said cylinder and operatively linked to said carriage in such manner that introduction of fluid power to said cylinder produces motion of said carriage away from said work, and escape of fluid pressure from said cylinder produces advance of said carriage towards said work, a valve for controlling escape of fluid power from said cylinder whereby to permit saw advance to cutting relationship with said work said valve being provided with a seat and a plunger reciprocable towards and away from said seat whereby to correspondingly vary fluid pressure escape, spring means normally biasing said plunger to valve-open position, an idler roll carried by said plunger and contacting the rear edge of said saw blade whereby backward flexure of said blade responsive to increase in cutting resistance causes valve-closing movement of said plunger to thereby reduce the rate of advance of said saw in inverse proportion to said cutting resistance, a movable arm carried by said carriage and having a second idler roll in contact with the rear edge of said saw blade at a point spaced from said first roll contact, and a second spring means biasing said movable arm to produce contact between said second roll and said blade, said first spring and said second spring being matched to produce approximately equal biasing forces on each saw blade at their respective points of contact with said blade.

2. Power saw means as defined in claim 1, and wherein a manually controllable valve is disposed in hydraulic series circuit with said plunger valve whereby to provide additional control means for limiting the rate of escape of said pressure fluid from said cylinder.

WILLIAM F. WELLS.
DANA H. WELLS.

REFERENCES CITED

The following references are of record in the file of this patent:

UNITED STATES PATENTS

| Number | Name | Date |
|---|---|---|
| 1,372,903 | Perkins et al. | Mar. 29, 1921 |
| 1,421,107 | Stowell | June 27, 1922 |
| 2,104,258 | Hunter et al. | Jan. 4, 1938 |

FOREIGN PATENTS

| Number | Country | Date |
|---|---|---|
| 588,875 | Great Britain | June 5, 1947 |